US008922142B2

United States Patent
Marcetic et al.

(10) Patent No.: US 8,922,142 B2
(45) Date of Patent: Dec. 30, 2014

(54) SYSTEMS AND METHODS FOR BRAKING AN ELECTRIC MOTOR

(71) Applicant: Nidec Motor Corporation, St. Louis, MO (US)

(72) Inventors: Darko Marcetic, Novi Sad (RS); Thomas J. Sheahan, Cary, IL (US)

(73) Assignee: Nidec Motor Corporation, St. Louis, MO (US)

( * ) Notice: Subject to any disclaimer, the term of this patent is extended or adjusted under 35 U.S.C. 154(b) by 148 days.

(21) Appl. No.: 13/657,335

(22) Filed: Oct. 22, 2012

(65) Prior Publication Data

US 2014/0111124 A1  Apr. 24, 2014

(51) Int. Cl.
*H02P 3/22* (2006.01)
*H02P 3/00* (2006.01)

(52) U.S. Cl.
CPC ........................................ *H02P 3/00* (2013.01)
USPC .......................... 318/379; 318/365; 318/375

(58) Field of Classification Search
CPC ........................................................ H02P 3/00
USPC ........................................... 318/379, 375, 365
See application file for complete search history.

(56) References Cited

U.S. PATENT DOCUMENTS

| | | | | |
|---|---|---|---|---|
| 3,644,810 | A * | 2/1972 | Lewus | 318/787 |
| 4,833,386 | A * | 5/1989 | Unsworth | 318/763 |
| 5,675,231 | A * | 10/1997 | Becerra et al. | 318/801 |
| 5,703,449 | A * | 12/1997 | Nagate et al. | 318/400.01 |
| 7,271,557 | B2 * | 9/2007 | Ajima et al. | 318/400.01 |

* cited by examiner

*Primary Examiner* — David S Luo
(74) *Attorney, Agent, or Firm* — Hovey Williams LLP (57) ABSTRACT

A motor controller for an electric motor having a stator and a rotor. The motor controller includes a power input for receiving AC power from a power source; a control input for receiving a control signal from a control; and circuitry for switching power from the power source to the electric motor in response to the control signal. The circuitry is operable to: apply a braking waveform to the stator while the rotor is rotating; monitor a reactive power of the stator; detect an increase in the reactive power of the stator to determine the rotor has substantially stopped rotating; and remove the braking waveform from the stator in response to detecting the increase in the reactive power.

27 Claims, 5 Drawing Sheets

SYSTEMS AND METHODS FOR BRAKING AN ELECTRIC MOTOR

FIELD

The present disclosure relates to systems and methods for braking electric motors.

BACKGROUND

Electric motors commonly include a stationary component called a stator and a rotating component called a rotor. The rotor rotates within (or around) the stator when the motor is energized with a driving waveform. When the driving waveform is removed from the motor, the rotor may coast to a standstill over time due to the inertia of the rotor and anything coupled to the rotor.

In many motor applications, it is desirable to stop rotation of the rotor as soon as the driving waveform is removed from the motor. For example, in washing machine applications, it is desirable to stop rotation of the washing machine motor after a high speed spin cycle so that the washing machine may be unloaded or switched to a slower speed wash or rinse cycle.

Accordingly, various techniques have been developed for braking electric motors. One such technique uses brake pads, pulleys, and/or other friction braking systems. Unfortunately, friction brakes add cost to a motor and are therefore not desirable for low cost applications such as washing machines. Friction brakes also eventually wear out with use and require repair or replacement.

Thus, many motor applications employ electric braking systems rather than friction brakes. One type of electric braking system employs regenerative braking technology. Although such technology is effective and energy efficient, it is far too complicated and expensive for lower cost applications such as washing machine motors. Another type of electric braking system is DC injection braking in which a direct current (DC) voltage is applied to a motor's stator windings to brake the rotor. The DC voltage creates a stationary magnetic field which applies a static torque to the rotor. This slows and eventually halts rotation of the rotor. As long as the DC voltage remains on the stator windings, the rotor is held in position and resists rotation. DC injection braking is relatively simple, cost-effective, and maintenance free and is therefore a popular choice of braking for many motor applications; however, it has not been used effectively in some applications as described below.

It is also often desirable to determine when a motor's rotor has stopped rotating so the rotor can be driven in the opposite direction, at a different speed, etc. This can be accomplished with a motor shaft sensor such as a Hall effect sensor, but such sensors increase the cost and complexity of motors and are therefore not desirable for many lower cost applications such as washing machine motors.

Thus, sensorless techniques for determining motor speed have been developed. One type of sensorless speed detection employs various algorithms for estimating when a rotor stops based on measured electrical parameters. However, the measured electrical parameters, and thus the results of the algorithms, are less accurate when the motor is being braked with the above-described DC injection braking techniques. Thus, DC injection braking techniques generally require a motor shaft sensor.

Another sensorless technique to ensure a motor has stopped rotating is to simply have a time delay that must lapse after power is removed from the motor. A similar technique uses DC injection braking to slow the motor as described above and continues the DC injection until a time delay has lapsed. The first of these methods unfortunately wastes time between motor cycles because the time delay must account for the maximum possible coast time of a motor, and the second of these methods wastes energy and time because the DC injection braking must be maintained longer to account for the maximum possible breaking time even though the motor may in fact stop sooner.

The above section provides background information related to the present disclosure which is not necessarily prior art.

SUMMARY

Embodiments of the present invention solve the above described problems by providing improved systems and methods for braking electric motors and for determining when the rotors of the motors have stopped rotating. For example, embodiments of the invention provide systems and methods for quickly and efficiently braking an electric motor with DC injection braking without the use of a motor speed sensor and without requiring time delays.

A motor assembly constructed in accordance with an embodiment of the present invention may be used in a washing machine, HVAC system, pump system or any other application. The motor assembly broadly comprises an electric motor and a motor controller for powering and controlling the motor. The motor may be any type of motor and includes a stator and a rotor. In one embodiment, the motor may be a three phase AC induction motor. The motor controller powers and controls the motor and is programmed or otherwise configured to perform at least some of the methods described herein. In one embodiment, the motor controller is programmed or configured to apply a DC injection braking waveform to the stator of the motor while the rotor is rotating, monitor a reactive power of the stator, detect an increase in the reactive power of the stator to determine the rotor has substantially stopped rotating, and remove the applied braking waveform from the stator in response to detecting the increase in the reactive power.

In a related embodiment, the motor controller monitors both the reactive power and active power of the stator, determines a ratio between the reactive power and the active power to determine the power factor of the stator, and uses the power factor to determine when the rotor has substantially stopped rotating. In one embodiment, the motor controller determines the rotor has stopped rotating when the power factor is approximately 1. Determining that the rotor has stopped by monitoring the power factor is advantageous because the power factor level that indicates the rotor has stopped is the same regardless of the magnitude of the DC injection braking waveform.

In another embodiment of the invention, the braking waveform is a controlled current waveform. The motor controller is programmed or configured in this embodiment to apply the controlled current braking waveform to the stator while the rotor is rotating, determine when the rotor has substantially stopped rotating, and remove the applied controlled current braking waveform from the stator in response to determining the rotor has substantially stopped rotating.

In yet another embodiment of the invention, the motor or the motor controller includes one or more current shunts. The motor controller is programmed or configured in this embodiment to apply a braking waveform to the stator while the stator is rotating, monitor a current through one of the current shunts while the braking waveform is applied to the stator, determine whether the rotor has substantially stopped rotating using the monitored current through the current shunt, and remove the applied braking waveform from the stator in response to determining the rotor has substantially stopped rotating.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
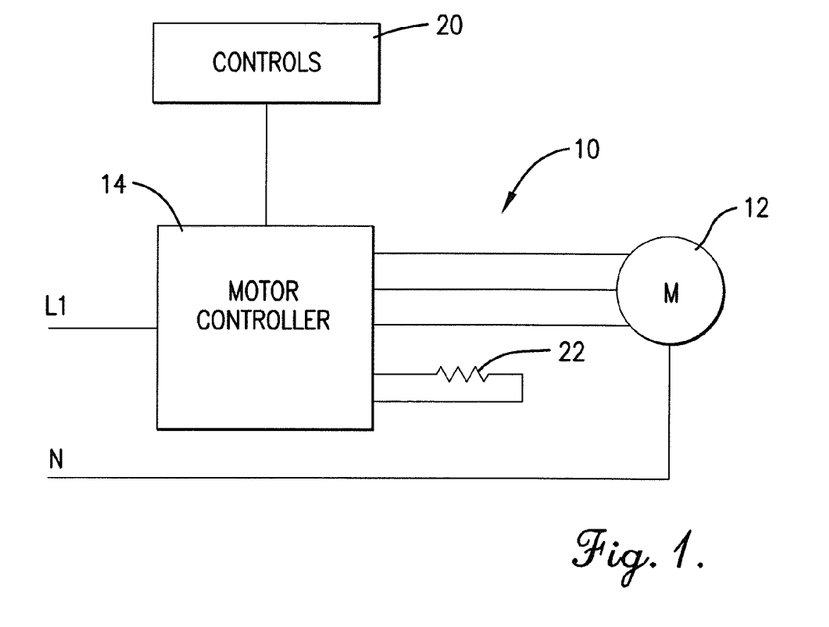
FIG. 1 is a block diagram of a motor assembly constructed in accordance with an embodiment of the invention.

Turning now to the drawing figures, and initially FIG. 1, a motor assembly 10 constructed in accordance with embodiments of the invention is illustrated. The motor assembly 10 may be used in any application, such as in a washing machine, HVAC system, pump system, or appliance. In one particular embodiment, the motor assembly 10 is designed for use with a horizontal axis, front-loading washing machine, but the principles of the present invention are equally applicable to all uses of the motor assembly.

An embodiment of the motor assembly 10 broadly includes an electric motor 12 and a motor controller 14. The motor assembly 10 may also include or be coupled with other components not relevant to the present invention.

Figure 2:
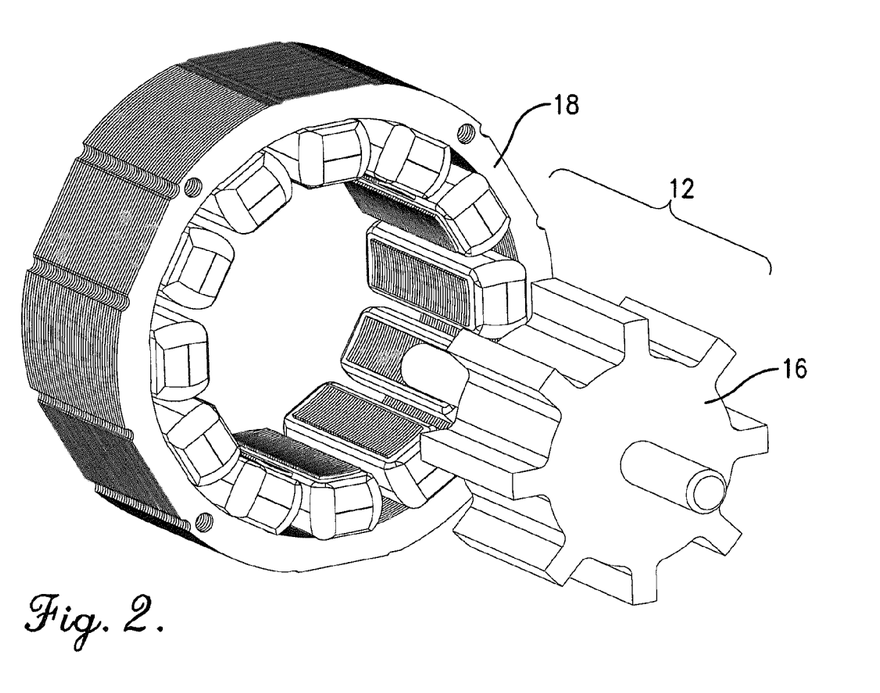
FIG. 2 is a schematic representation of the stator and rotor of the motor in the motor assembly of FIG. 1.

As best illustrated in FIG. 2, the electric motor 12 includes a rotor 16 and a stator 18. The motor 12 may operate on direct current (DC) or alternating current (AC), may be synchronous or asynchronous, and may be single phase or three phase. The motor 12 may be of any type, including but not limited to, a brushed DC motor, a switched reluctance motor, a coreless or ironless DC motor, a series wound universal motor, an induction motor, a torque motor, or a stepper motor. Moreover, the motor may be fixed speed, multi-speed, or variable speed and may have any horsepower (HP) rating. In one particular embodiment of the invention, the motor 12 is a ⅓-1 HP, three phase, reversible and variable speed switched reluctance type motor. Such a motor provides maximum drive performance at a competitive price for washing machine applications which require a wide range of operating speeds and a high start-up torque. However, the principles of the present invention are not limited to any particular motor type, technology, or size.

The motor controller 14 provides power to and controls operation of the electric motor 12 and is programmed or otherwise configured to perform one or more of the function or methods described below. The motor controller 14 may include any combination of circuitry, hardware, firmware, and/or software. In one particular embodiment, the motor controller 14 includes a custom application specific integrated circuit (ASIC) with a microprocessor that controls and drives a 3-phase inverter and various other electronic components.

As shown in FIG. 1, the motor controller 14 may receive power from a single phase AC supply voltage at 115 VAC supplied by connections L1 and N, where L1 represents the "hot" side of the AC supply and N represents neutral, which is typically at earth potential. The AC supply voltage may also be 230 VAC, in which case the neutral line would be replaced with another hot supply line. The AC supply voltage may also be three phase 480 VAC.

The motor controller 14 may receive commands or operating instructions from one or more controls 20 such as a keypad, switches, or buttons as are commonly found on washing machines and other appliances and devices. The controls may be one or more separate components or may be integrated in the motor controller 14.

The motor controller 14 may also be coupled to a single current shunt 22 for determining a stator current as described below. This single current shunt 22 may be a discrete component coupled to the printed circuit board of the motor controller ASIC or may be incorporated in the stator of the motor or the inverter module of the motor controller.

Aspects of the invention may be implemented with one or more computer programs stored in or on computer-readable medium residing on or accessible by the microprocessor of the motor controller 14. Each computer program preferably comprises an ordered listing of executable instructions for implementing logical functions in the motor controller 14.

Each computer program can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Figure 5:
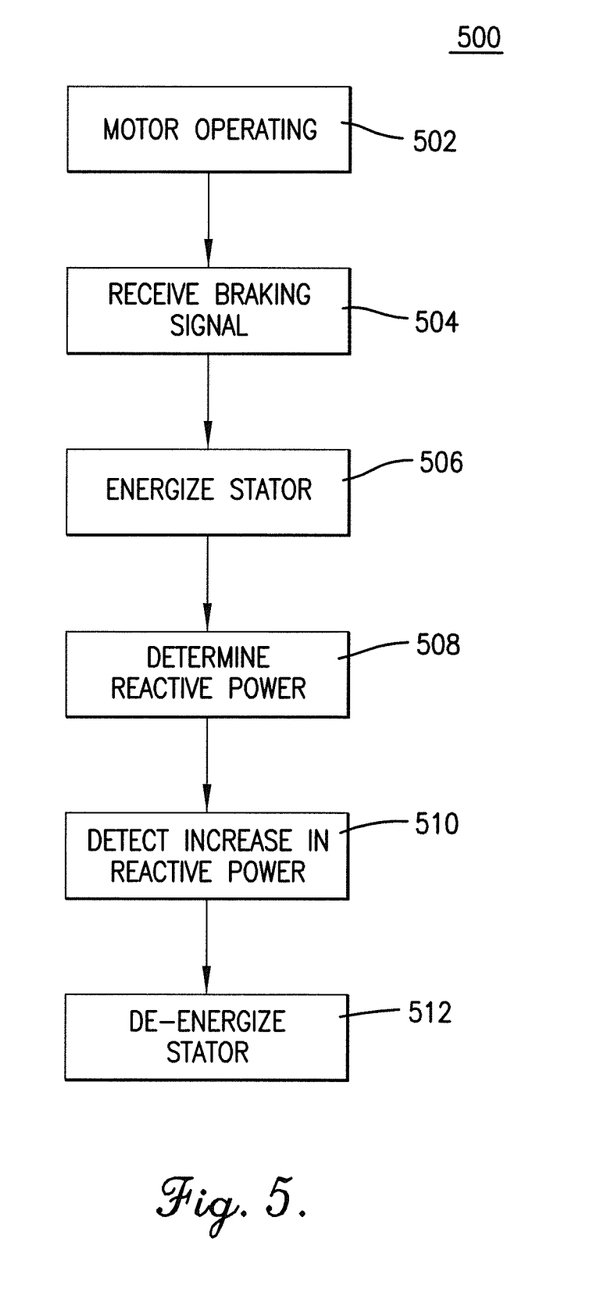
FIG. 5 is a flow diagram depicting steps in a method of the invention and/or code segments of a computer program of the invention.

According to one aspect of this disclosure, the motor controller 14 is programmed or otherwise configured to implement a method 500 of braking the electric motor 12. The method broadly includes the steps of energizing the stator 18 of the motor 12, with a braking waveform determining a reactive power of the stator 18, detecting an increase in the determined reactive power of the stator 18, and removing the braking waveform from the stator 18 in response to detecting the increase in the determined reactive power of the stator. The increase in reactive power indicates that the rotor 16 has substantially stopped rotating.

In a related embodiment, the motor controller monitors both the reactive power and active power of the stator, determines a ratio between the reactive power and the active power to determine the power factor of the stator, and uses the power factor to determine when the rotor has substantially stopped rotating. In one embodiment, the motor controller determines the rotor has stopped rotating when the power factor is approximately 1. Determining that the rotor has stopped by monitoring the power factor is advantageous because the power factor level that indicates the rotor has stopped is the same regardless of the magnitude of the DC injection braking waveform.

The flow chart of FIG. 5 shows the functionality and operation of a preferred implementation of the above described method 500 in more detail. In this regard, some of the blocks of the flow chart may represent the method 500 and/or a module segment or portion of code of the computer programs of the present invention. In some alternative implementations, the functions noted in the various blocks may occur out of the order depicted in FIG. 5. For example, two blocks shown in succession in FIG. 5 may in fact be executed substantially concurrently, or the blocks may sometimes be executed in the reverse order depending upon the functionality involved.

The method 500 begins while the rotor 16 of the motor 12 is moving as depicted in box 502. For example, in the embodiment in which the motor assembly 10 is used in a washing machine, the motor 12 may be operating at a high RPM during a spin cycle.

While or shortly after the motor 12 is de-energized and begins to coast, the motor controller 14 may receive or internally process a brake signal as depicted in box 504. For example, the motor controller 14 may receive a signal from an internal or external timing circuit that indicates a spin cycle or other motor cycle has ended and that the rotor should be slowed or stopped.

In response to the brake signal or other indication that the motor 12 has been de-energized, the motor controller 14 energizes the stator 18 to apply a braking force to the rotor in order to brake the rotor as depicted in box 506. The stator 18 may be energized by driving the stator with a controlled current waveform as described in more detail below in connection with the method 600. Alternatively, the stator 18 may be driven with a voltage controlled waveform.

The motor controller 14 then determines a reactive power of the stator 18 as depicted in box 508. The reactive power may be determined in any conventional manner. For example, the reactive power may be determined based on detecting current through the current shunt 22 as described in more detail below in connection with the method 700. The reactive power may also be determined through multiple current shunts, etc.

The motor controller 14 then detects an increase in the reactive power of the stator 18 as depicted in box 510. The increase in the reactive power indicates the rotor 16 has substantially stopped rotating. As a part of this step, the motor controller may detect an increase in the magnitude of the stator reactive power. Alternatively, the motor controller may detect an increase in a ratio of the determined reactive power and a determined active power of the stator to determine the rotor has stopped rotating.

Figure 3:
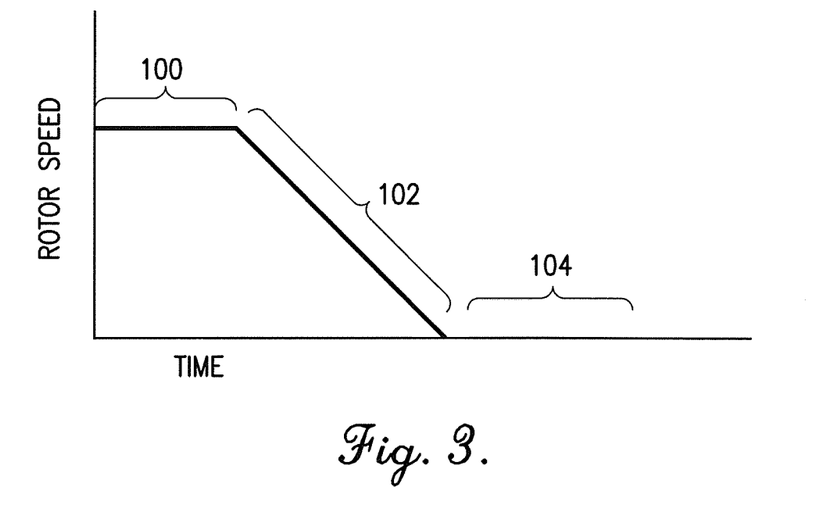
FIG. 3 is a graph of rotor speed over a time period according to one exemplary embodiment of the present disclosure.
Figure 4:
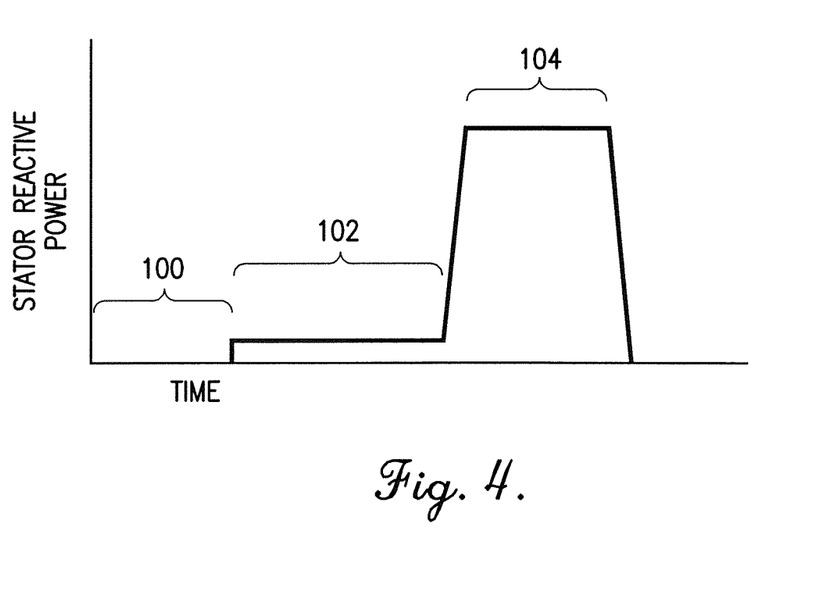
FIG. 4 is a graph of stator reactive power over the same time period as FIG. 3.

FIGS. 3 and 4 show graphs that illustrate a specific embodiment of the method 500. FIG. 3 shows a motor's rotor speed over a time period, and FIG. 4 shows the stator's reactive power over the same time period. During a first time period 100, the rotor 16 rotates and the stator 18 reactive power is zero. Braking begins at the beginning of a second time period 102 as the stator 18 is energized with a braking waveform, causing the rotor 16 to slow down. At the end of the second time period 102, the rotor 16 approaches zero speed and the stator reactive power increases. The motor controller 14 detects the increase in stator reactive power, and at the end of a third period 104, the motor controller 14 removes the braking waveform from the stator in response to the detected increase in stator reactive power.

The example shown in FIGS. 3 and 4 may be altered without departing from the scope of the present invention. For example, the stator reactive power may be greater than zero during the first period 100. Also, the stator reactive power may be zero during the second period 102. The third period 104 may be very brief to minimize the power dissipated in the stator.

The above-described method 500 provides numerous advantages. For example, the method minimizes the time that the stator 18 is energized with the braking waveform in order to save energy and minimize power dissipation that may damage the stator. Specifically, stator power dissipation is minimized by de-energizing the stator 18 when the rotor 16 has substantially stopped rotating. Also, a shorter braking cycle time increases the throughput of devices driven by the electric motor 12. For example, when the motor assembly 10 is used in a washing machine, the method 500 allows quick and efficient braking of the motor 12 after a high speed spin cycle so that the washing machine can be unloaded or operated in a different cycle.

Figure 6:
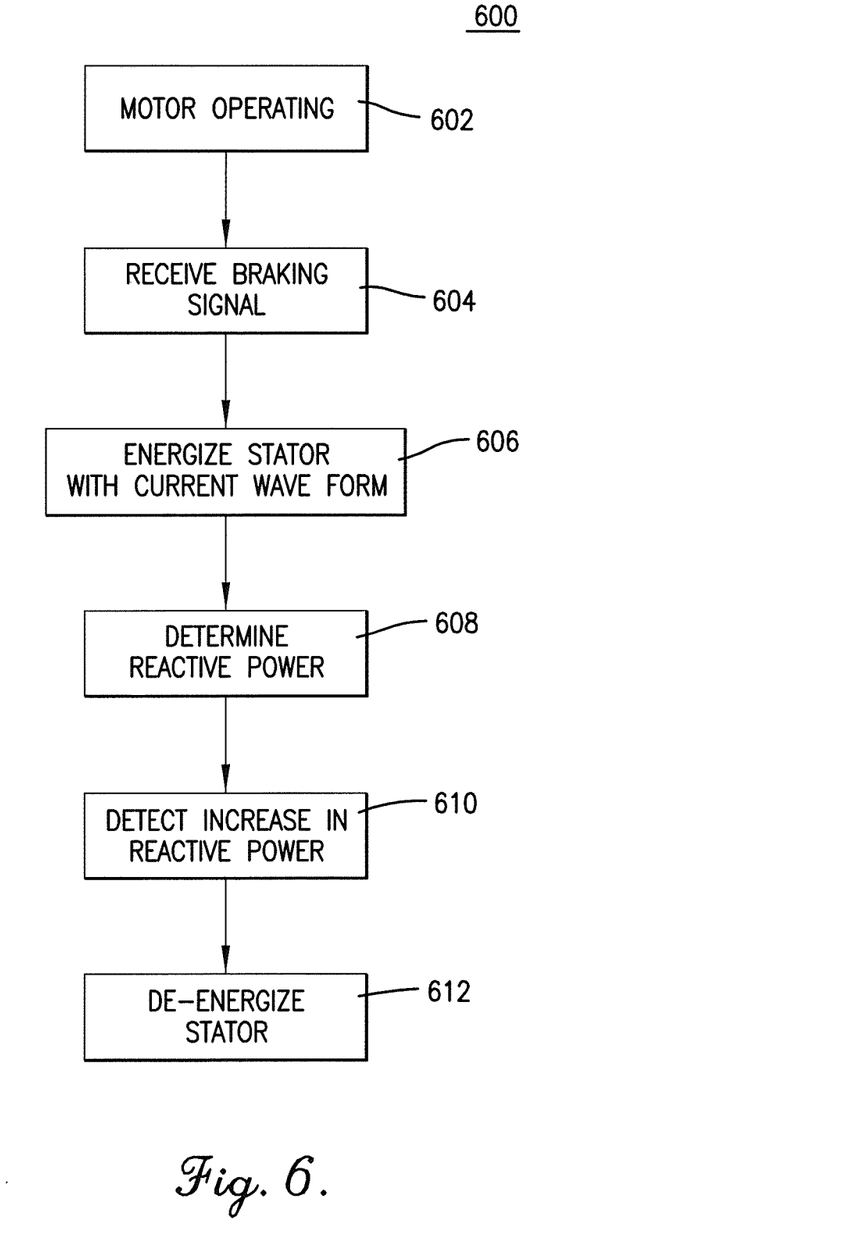
FIG. 6 is a flow diagram depicting steps in another method of the invention and/or code segments of another computer program of the invention.

According to another aspect of this disclosure, the motor controller 14 may be programmed or otherwise configured to implement another method 600 of braking the electric motor 12. As with the method 500, the method 600 broadly includes the steps of energizing the stator 18 of the motor 12 to brake the motor, determining a reactive power of the stator 18, detecting an increase in the determined reactive power of the stator 18, and removing the braking waveform from the stator in response to detecting the increase in the determined reactive power of the stator. As explained in more detail below, the method 600 energizes the stator of the motor with a controlled current braking waveform.

The flow chart of FIG. 6 shows the functionality and operation of a preferred implementation of the above described method 600 in more detail. In this regard, some of the blocks of the flow chart may represent the method 600 and/or a module segment or portion of code of the computer programs of the present invention. In some alternative implementations, the functions noted in the various blocks may occur out of the order depicted in FIG. 6. For example, two blocks shown in succession in FIG. 6 may in fact be executed substantially concurrently, or the blocks may sometimes be executed in the reverse order depending upon the functionality involved.

Steps 602, 604, 608, 610, and 612 of method 600 are substantially identical to steps 502, 504, 508, 510, and 512, respectively, of method 500 and will therefore not be described again.

In step 606 of the method 600, the motor controller 14 energizes the stator 18 with a controlled current waveform to apply a braking force to the rotor 16 in order to brake the rotor. The motor controller 14 may also vary the amplitude of the controlled current waveform. In one embodiment, the amplitude of the controlled current waveform is varied at a fixed frequency. The fixed frequency is preferably between about 1 Hz and about 10 Hz. More preferably the fixed frequency is about 2 Hz.

Energizing the stator 18 with a controlled current waveform to brake the rotor 16 is superior to braking the motor with a controlled voltage. This is because the stator generates a magnetic field based on the stator current (not based on the stator voltage) and it is the magnetic field that interacts with the rotor to brake the rotor. A controlled stator voltage may generate variable stator current since the stator resistance changes as the stator heats. Thus, a controlled stator current will result in more consistent rotor braking than would a controlled stator voltage.

Figure 7:
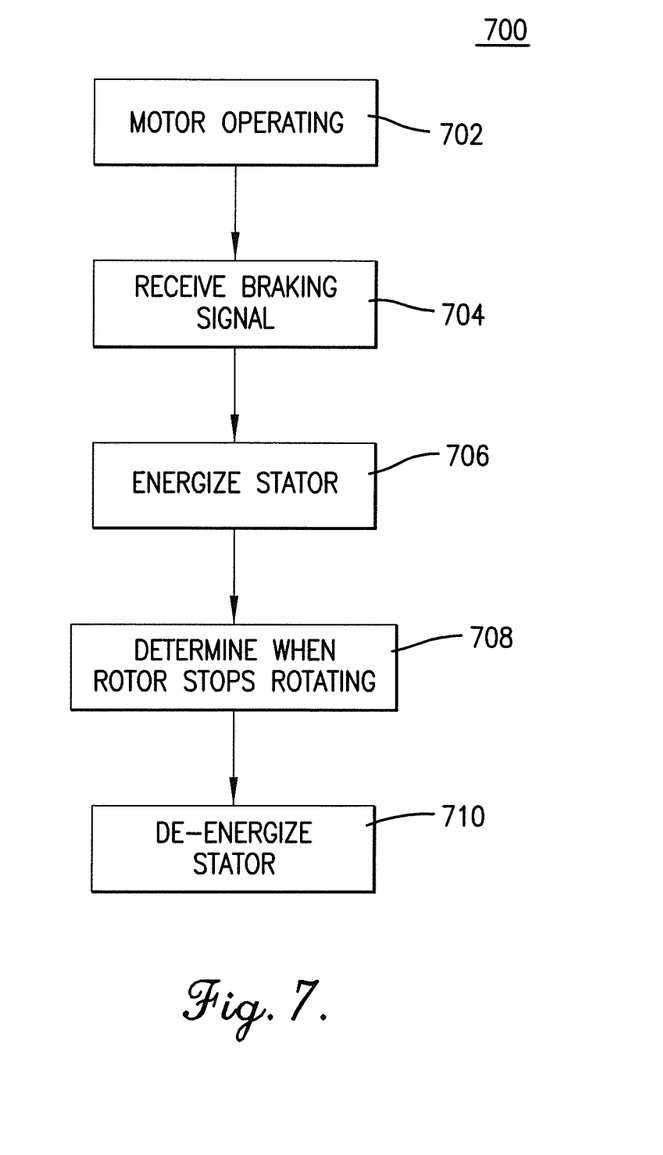
FIG. 7 is a flow diagram depicting steps in yet another method of the invention and/or code segments of another computer program of the invention.

According to another aspect of this disclosure, the motor controller 14 is programmed or otherwise configured to implement another method 700 of braking the electric motor 12. The method 700 broadly includes the steps of energizing the stator of the motor to brake the motor, determining when the rotor stops rotating, and de-energizing the stator 18 in response to determining that the rotor has stopped. As explained in more detail below, the method 700 determines the rotor 16 has stopped rotating by monitoring the current shunt 22.

The flow chart of FIG. 7 shows the functionality and operation of a preferred implementation of the above described method 700 in more detail. In this regard, some of the blocks of the flow chart may represent the method 700 and/or a module segment or portion of code of the computer programs of the present invention. In some alternative implementations, the functions noted in the various blocks may occur out of the order depicted in FIG. 7. For example, two blocks shown in succession in FIG. 6 may in fact be executed substantially concurrently, or the blocks may sometimes be executed in the reverse order depending upon the functionality involved.

Steps 702, 704, and 706 of method 700 are substantially identical to steps 502, 504, and 506, respectively, of method 500 and will therefore not be described again.

In step 708 of the method 700, the motor controller 14 determines a current through the single current shunt 22. This step may include computing one or more motor phase currents as a function of the signal on the current shunt. The computed phase currents may provide the indication that the rotor has substantially stopped rotating. Further, the signal on the single current shunt may indicate an increase of a reactive power of the stator. Alternatively, the signal may indicate an increase of the motor power factor, etc.

A single current shunt is lower cost than multiple current shunts; accordingly, implementing this method may be lower cost than implementing a method that requires multiple current shunts.

In step 710 of the method 700, the motor controller 14 de-energizes the stator 18 to remove the braking force on the rotor 16. This may be done in response to a signal on the current shunt 22 indicating that the rotor 16 has stopped rotating.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A motor controller for an electric motor having a stator and a rotor, the motor controller comprising:
a power input for receiving power from a power source; and
circuitry for switching power from the power source to the electric motor, wherein the circuitry is operable to:
apply a braking waveform to the stator while the rotor is rotating;
monitor a reactive power of the stator;
detect an increase in the reactive power of the stator to determine the rotor has substantially stopped rotating; and
remove the braking waveform from the stator in response to detecting the increase in the reactive power.

2. The motor controller of claim 1, wherein the circuitry is operable to detect an increase in a magnitude of the reactive power of the stator to determine the rotor has stopped.

3. The motor controller of claim 1, wherein the circuitry is operable to monitor a real power of the stator and detect an increase in a ratio of the reactive power to the real power to determine the rotor has stopped.

4. The motor controller of claim 1, wherein the braking waveform is a controlled or constant current signal.

5. The motor controller of claim 4, wherein the motor or motor controller includes one or more current shunts, and wherein the motor controller is operable to monitor a current through one of the current shunts to monitor the reactive power of the stator and thus determine the rotor has stopped rotating.

6. The motor controller of claim 1, further comprising a control input for receiving a control signal from a control to signal the circuitry to apply the breaking waveform.

7. The motor controller of claim 1, wherein the circuitry is provided in an application specific integrated circuit (ASIC) with a programmed microprocessor.

8. A motor controller for an electric motor having a stator and a rotor, the motor controller comprising:
a power input for receiving AC power from a power source;
a control input for receiving a control signal from a control;
circuitry for switching power from the power source to the electric motor in response to the control signal, wherein the circuitry is operable to:
apply a controlled current braking waveform to the stator while the rotor is rotating;

determine when the rotor has substantially stopped rotating by monitoring a reactive power of the stator and detecting an increase in the reactive power of the stator; and remove the controlled current braking waveform from the stator in response to determining the rotor has substantially stopped rotating.

9. The motor controller of claim 8, wherein the controlled current waveform has a fixed frequency.

10. The motor controller of claim 9, wherein the fixed frequency is between about 1 Hz and about 10 Hz.

11. The motor controller of claim 10, wherein the circuitry varies an amplitude of the applied controlled current waveform.

12. A motor controller for an electric motor having a stator and a rotor, the motor controller comprising:
a power input for receiving AC power from a power source;
a control input for receiving a control signal from a control;
circuitry for switching power from the power source to the electric motor in response to the control signal, wherein the circuitry is operable to:
apply a braking waveform to the stator while the rotor is rotating;
monitor a current through a current shunt while the braking waveform is applied to the stator;
determine whether the rotor has substantially stopped rotating by detecting an increase in a reactive power of the stator using the monitored current through the current shunt; and
remove the applied braking waveform from the stator in response to determining the rotor has substantially stopped rotating.

13. The motor controller of claim 12, wherein the motor controller further determines the rotor has stopped rotating by computing one or more phase currents of the motor using the monitored current through the current shunt.

14. A motor assembly comprising:
an electric motor having a stator and a rotor; and
a motor controller for driving and controlling the electric motor, the motor controller comprising:
a power input for receiving AC power from a power source;
a control input for receiving a control signal from a control;
circuitry for switching power from the power source to the electric motor in response to the control signal, wherein the circuitry is operable to:
apply a braking waveform to the stator while the rotor is rotating;
monitor a reactive power of the stator;
detect an increase in the reactive power of the stator to determine the rotor has substantially stopped rotating; and
remove the braking waveform from the stator in response to detecting the increase in the reactive power.

15. The motor controller of claim 14, wherein the circuitry is operable to determine the rotor has stopped rotating by detecting an increase in a magnitude of the reactive power of the stator.

16. The motor controller of claim 14, wherein the circuitry is operable to determine the rotor has stopped rotating by monitoring a real power of the stator and detecting an increase in a ratio of the reactive power to the real power.

17. A method of braking an electric motor having a stator and a rotor, the method comprising:
applying a braking waveform to the stator while the rotor is rotating;
monitoring a reactive power of the stator;
detecting an increase in the reactive power of the stator indicating the rotor has substantially stopped rotating; and
removing the applied braking waveform from the stator in response to detecting said increase.

18. The method of claim 17, wherein the detecting step includes detecting an increase in a magnitude of the reactive power of the stator.

19. The method of claim 17, further comprising the step of monitoring a real power of the stator, and wherein the detecting step includes detecting the increase by detecting an increase in a ratio of the reactive power to the real power.

20. The method of claim 17, wherein the braking waveform is a controlled current waveform.

21. The method of claim 20, wherein the motor includes one or more current shunts, and wherein monitoring the reactive power of the stator includes monitoring a current through one of the current shunts.

22. A method of braking an electric motor having a stator and a rotor, the method comprising:
applying a controlled current braking waveform to the stator while the rotor is rotating;
determining when the rotor has substantially stopped rotating by monitoring a reactive power of the stator and detecting an increase in the reactive power of the stator; and
removing the applied controlled current braking waveform from the stator in response to determining the rotor has substantially stopped rotating.

23. The method of claim 22, wherein the controlled current waveform has a fixed frequency.

24. The method of claim 23, wherein the fixed frequency is between about 1 Hz and about 10 Hz.

25. The method of claim 22, further comprising the step of varying an amplitude of the applied controlled current waveform.

26. A method of braking an electric motor assembly having an electric motor and a motor controller, the electric motor including a stator and a rotor, the motor controller including one or more current shunts, the method comprising:
applying a braking waveform to the stator while the rotor is rotating;
monitoring a current through one of said one or more current shunts while the braking waveform is applied to the stator;
determining whether the rotor has substantially stopped rotating by detecting an increase in reactive power of the stator using the monitored current through only one of said one or more current shunts; and
removing the applied braking waveform from the stator in response to determining the rotor has substantially stopped rotating.

27. The method of claim 26, wherein the determining step further includes computing one or more phase currents of the motor using the monitored current through the current shunt.

* * * * *